US012089066B2

(12) United States Patent
Kiilerich Pratas et al.

(10) Patent No.: US 12,089,066 B2
(45) Date of Patent: Sep. 10, 2024

(54) OPTIMIZED BEAMFORMING FOR A DISCOVERY PROCESS

(71) Applicant: Nokia Technologies Oy, Espoo (FI)

(72) Inventors: Nuno Manuel Kiilerich Pratas, Gistrup (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 141 days.

(21) Appl. No.: 17/798,146

(22) PCT Filed: Feb. 2, 2021

(86) PCT No.: PCT/EP2021/052390
§ 371 (c)(1),
(2) Date: Aug. 8, 2022

(87) PCT Pub. No.: WO2021/160467
PCT Pub. Date: Aug. 19, 2021

(65) Prior Publication Data
US 2023/0072170 A1 Mar. 9, 2023

(30) Foreign Application Priority Data

Feb. 11, 2020 (FI) .................................. 20205140

(51) Int. Cl.
*H04W 16/28* (2009.01)

(52) U.S. Cl.
CPC .................................. *H04W 16/28* (2013.01)

(58) Field of Classification Search
CPC ..... H04W 16/28; H04W 8/005; H04W 72/02; H04W 72/046; H04W 76/10; H04B 7/0695; H04B 7/0617; H04B 7/088
See application file for complete search history.

(56) References Cited

U.S. PATENT DOCUMENTS

| | | | |
|---|---|---|---|
| 2017/0222693 A1* | 8/2017 | Shen | H04B 7/0456 |
| 2017/0331577 A1* | 11/2017 | Parkvall | H04L 5/1469 |
| 2018/0343605 A1* | 11/2018 | Wu | H04W 72/0446 |
| 2019/0253955 A1 | 8/2019 | Abedini et al. | |
| 2020/0045664 A1 | 2/2020 | Choi et al. | |

* cited by examiner

*Primary Examiner* — Sung S Ahn
(74) *Attorney, Agent, or Firm* — Barta Jones, PLLC

(57) ABSTRACT

It is disclosed a method, including performing a discovery process by a first user terminal in a wireless setting, wherein the discovery process includes defining a plurality of beamforming beams for a spatially selective transmission or reception, forming at least one beam sweeping pattern from the plurality of beamforming beams at the first user terminal, wherein the plurality of beamforming beams forming the at least one beam sweeping pattern differ in at least one of a range and a directivity, and wherein the range of the plurality of beamforming beams is divided in at least two categories differing in range.

14 Claims, 7 Drawing Sheets

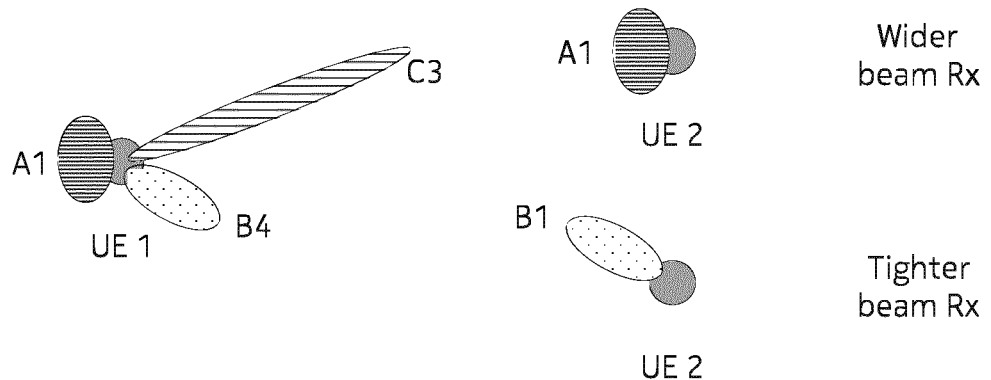
Fig. 7
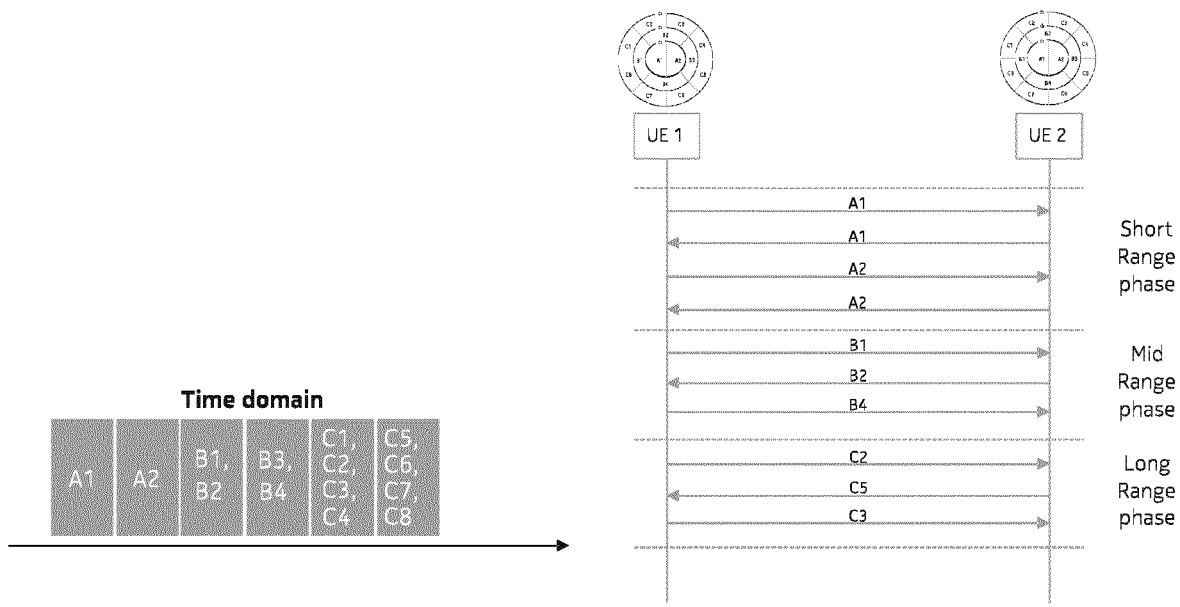
Fig. 8
Fig. 9

| Time | UE1 (Tx) | UE2 (Rx) |
|------|----------|----------|
| 1 | A1 | A1 |
| 2 | A2 | A1 |
| 3 | A1 | A2 |
| 4 | A2 | A2 |
Fig. 10
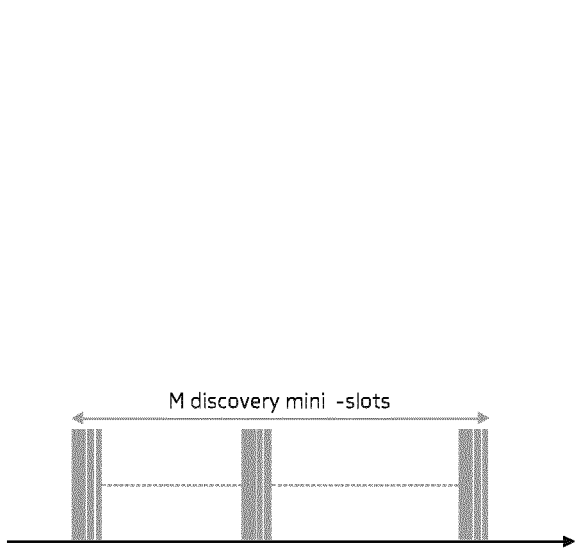
Fig. 11a
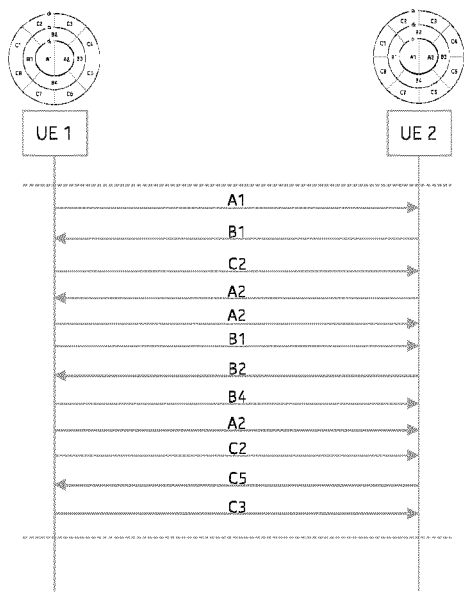
Fig. 11b

OPTIMIZED BEAMFORMING FOR A DISCOVERY PROCESS

CROSS REFERENCE TO RELATED APPLICATION

This patent application is a U.S. National Stage application of International Patent Application Number PCT/EP2021/052390 filed Feb. 2, 2021, which is hereby incorporated by reference in its entirety, and claims priority to FI 20205140 filed Feb. 11, 2020.

TECHNICAL FIELD

At least some example embodiments relate to an apparatus and method for sidelink, vehicle to vehicle (V2V), and/or device to device (D2D) communication. More specifically, the discovery phase is targeted, which finds other user terminals in the proximity.

LIST OF ABBREVIATIONS/ACRONYMS

3GPP 3$^{rd}$ Generation Partnership Project
BS Base Station
D2D Device to Device
eNB Evolved NodeB
E-UTRAN Evolved UMTS Terrestrial Radio Access Network
gNB Next Generation NodeB
IMSI International Mobile Subscriber Identifier
LTE Long Term Evolution
mmW Millimeter Wave
NR New Radio
PLMN Public Land Mobile Network
PPPP ProSe Per Packet Priority
PRB Physical Resource Block
PRC Radio Resource Control
ProSe Proximity Services
ProSe Code ProSe Application Code
Rx Receiver
SL Sidelink
SSB Synchronization Signal Block
TRP Tx/Rx Point
Tx Transmitter
UE User Equipment
V2X Vehicle to X

BACKGROUND

In conventional cellular traffic a base station (BS, also referred to as NodeB (NB) or evolved NodeB (eNB) or next generation NodeB (gNB)) communicates with user terminals (also referred to as user equipment (UE)) via dedicated uplink (UL) and downlink (DL) channels, for both signaling and data.

In LTE-Advanced (3GPP Rel. 12) this concept was extended by Proximity Service (ProSe) functions for device to device (D2D) communication with the introduction of the sidelink (SL). It enables direct communication of UEs in close proximity to each other without much involvement of a BS. The initial phase during a SL communication involves a discovery process to find suitable devices in the proximity and uses the so called PC5 interface. A detailed description of SL communication can be found in

[1] "LTE-Advanced (3GPP Rel.12) Technology Introduction", 1MA252 2E, Rohde & Schwarz. Further, an example for a simplified reference architecture for ProSe is shown in FIG. 1. Herein, two UEs are connected to the same service provider's public land mobile network (PLMN). The interface between the two UEs is the PC5 interface and between each UE and the so called ProSe function a PC3 interface is installed. The ProSe function is one of the most relevant functional entities shown in FIG. 1 and has a very important role in the process for Direct Discovery and Direct Communication.

In a traditional non-millimeter Wave (mmW) setting the main challenge associated with the discovery process is to find common resources (e.g., frequency and/or time slots) over which a transmitting (Tx) UE and a receiving (Rx) UE can discover each other. This was addressed for LTE SL ProSe by having an eNB broadcast the time and frequency resources dedicated to the discovery process via the SIB type 19. SIB type 19 provides the information about the radio resource pool in which a UE is allowed to transmit or receive discovery messages. The resource pool is defined by a discovery period that can be up to 1024 radio frames or 10.24 seconds long. Additionally, a resource configuration for the frequency domain is provided. The explicit number of resource blocks is broadcasted, including a start and end number.

In New Radio (NR) another issue arises related to the discovery process, as it is expected that SL operation will be extended to mmW operation. Operation under these circumstances requires beam alignment, where both Tx and Rx user terminals also have to align their respective beams in order to communicate with each other.

Similarly, as done for the resource allocation in LTE SL, the beam alignment in NR could be aided by the network infrastructure. Yet, this is not always possible as the SL communication can occur between UEs in different PLMNs, or between UEs in out-of-coverage scenarios with no eNB being present.

Furthermore, network aided beam alignment requires significant information to be shared back and forth with the network related to the UE 3D position and orientation, which needs to be exchanged fast enough to cope with any eventual UE movement (e.g., rotation and translation in space). Signaling all this information quickly exhausts available resources and may collide with the signaling requirements of other services. Additionally, in some cases the UEs might be close to each other, but the environment (e.g., a wall or other obstacles) might prevent their direct communication. As it cannot be expected that the network will also be aware of, e.g., obstacles around the geographical location of the UE (i.e., there is currently no mechanism that collects this information), this might lead to further signaling overhead without a successful discovery process taking place.

Another approach is that the UEs attempt to perform the beam alignment without any coordination.

Such a scenario is shown in FIG. 2 for three time instances (T=1, T=2 and T=3). A random approach can require several attempts, wherein the necessary attempts depend on the beamforming beams at each UE and the beamforming sweeping patterns. Even after three time instances and trials, the beamforming beams could not be aligned in the considered example. In a worst case, the UEs will never discover each other as they are operating their beamforming sweeping operation at the same speed and the beamforming beams are oriented in orthogonal directions.

SL discovery over a PC5 interface between two UEs was defined for single antenna and at sub-6 GHz frequency ranges in LTE Rel. 12 and Rel. 13 and is described in, e.g., [1].

The NR beamforming management procedure over an interface between a UE and the E-UTRAN (Uu interface) are classified into three different phases (P-1, P-2, P-3) which are shown in FIG. 3.

The phase P-1 is associated with the initial access. It enables the UE to perform a measurement on different beamforming beams of the Tx/Rx point (TRP) to select the optimal TRP Tx beamforming beam and the optimal UE Rx beamforming beam. More precisely, this involves a beamforming sweep over a set of different Tx beamforming beams at the TRP as well as a beamforming sweep at the UE from a set of different Rx beamforming beams.

The phases P-2 and P-3 refine the beamforming beams at the TRP and the UE, respectively. The selection of the optimal beamforming beam is performed from a refined, smaller set of beamforming beams based on the previous choice in phase P-1. It requires the exchange of explicit beamforming signaling, which includes the beam alignment reference signals as well as any eventual reporting.

Existing beam alignment schemes proposed for mmW applications are mainly based on beam sweeping and use a hierarchical beam codebook, which requires the use of wide beams at the beginning. However, such wide beams suffer low antenna gains.

SUMMARY

It is an object of at least some of the example embodiments to improve the prior art.

This object is achieved by the methods, apparatuses and non-transitory storage media as specified in the appended claims.

Further, computer program products, comprising computer executable code, which, when executed by a processor, perform the method according to any of the method aspects are provided.

According to at least some example embodiments, at least one of the following advantages is achieved:
Improvement of the chance for successful discovery of other UEs in the proximity of a UE.
Priorization of UEs in closer proximity which are of greater importance than those further away.
Improved use of the signaling resources during the discovery process.
Scheduling of the signaling resource pools even without network coverage.

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the appended drawings, wherein:

FIG. 7 shows a behavior of the UE while transmitting and receiving when the discovery process is performed with different beamforming beams.

FIG. 8 shows an exemplary scheduling of a beam sweeping pattern over time, wherein short range beamforming beams are prioritized over longer range beamforming beams.

FIG. 9 shows an exemplary signaling diagram during a discovery process between two UEs.

FIG. 10 shows a table providing an exemplary beamforming sweeping pattern for four time instances.

FIG. 11a shows an example of M slots of a resource pool for a pattern based scheduling.

FIG. 11b shows an exemplary signaling diagram during a discovery process between two UEs.

DETAILED DESCRIPTION OF CERTAIN EXAMPLE EMBODIMENTS

Herein below, certain aspects are exemplified by at least some embodiments, which are described in detail with reference to the accompanying drawings. Features of the example embodiments can be freely combined with each other unless otherwise described. However, it is to be expressly understood that the description of certain example embodiments/aspects is given by way of an example only, and that it is not intended to be understood as limiting the application to the details disclosed.

It is to be understood that any of the modifications mentioned can be applied singly or in combination to the respective aspects to which they refer, unless they are explicitly stated as exclusive alternatives.

Moreover, it is to be understood that the apparatus is configured to perform the corresponding method, although in some cases only the apparatus or only the method is described.

References to standards whether existing or under development, serve as a mere example and are not to be understood as limiting the concept(s) suggested according to one or more aspects of the at least example embodiments.

According to at least some example embodiments, a first UE performs a discovery process in a wireless setting (e.g., during the discovery process of a SL communication) and defines a plurality of beamforming beams for spatially selective transmission or reception. From this plurality of beamforming beams, the first UE forms at least one beamforming sweeping pattern such that the beamforming beams differ in at least one of a range and a directivity. In addition to that, the range is divided in at least two categories allowing to differentiate at least two kinds of beamforming beams targeting at least two different ranges.

Figure 1:
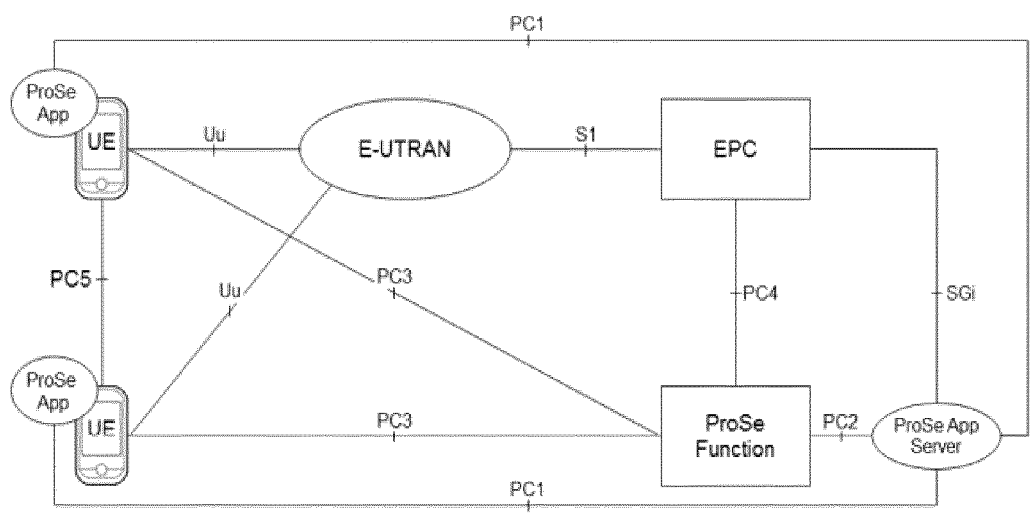
FIG. 1 shows a simplified reference architecture for ProSe.
Figure 2:
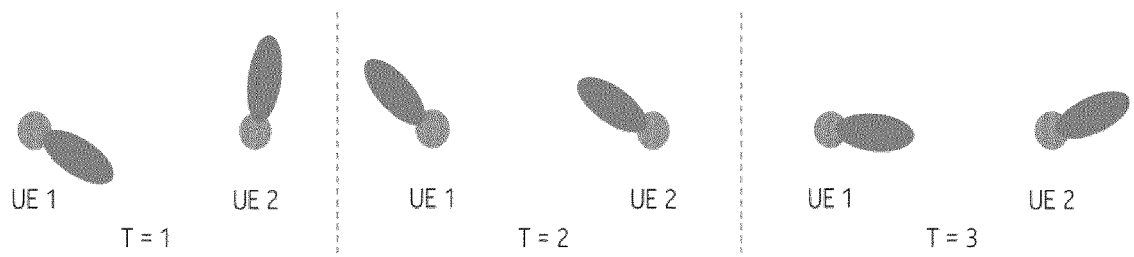
FIG. 2 shows different time instances of a random approach for finding optimal beamforming beams of two UEs.
Figure 3:
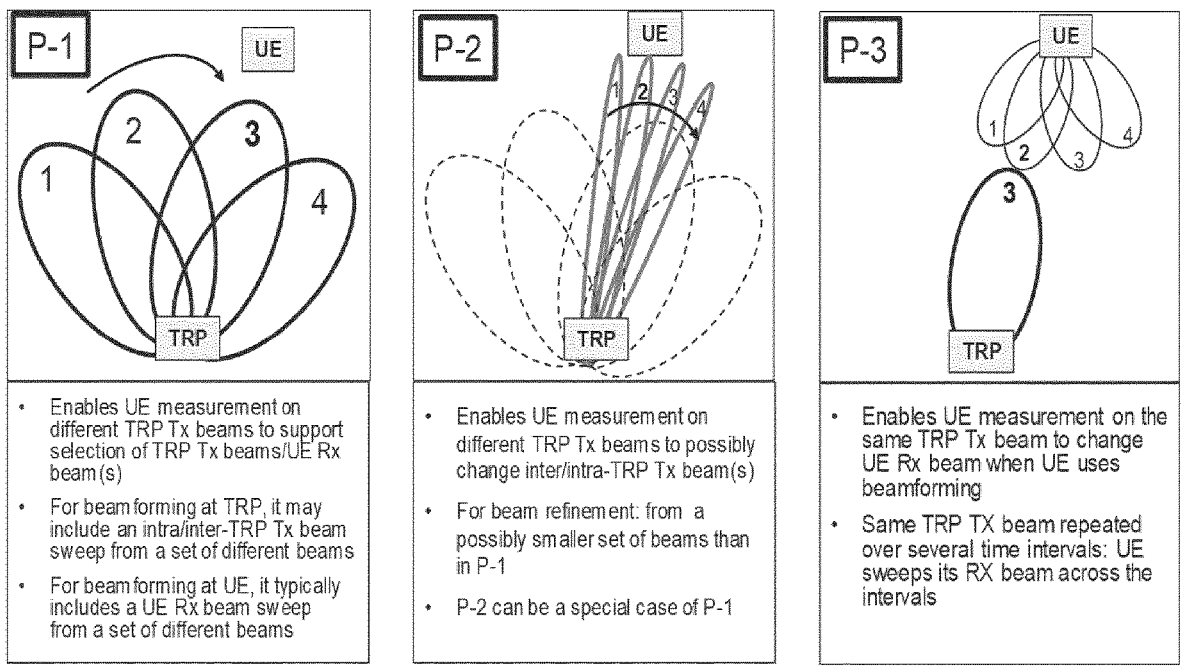
FIG. 3 shows a beamforming management process proposed for NR.
Figure 4:
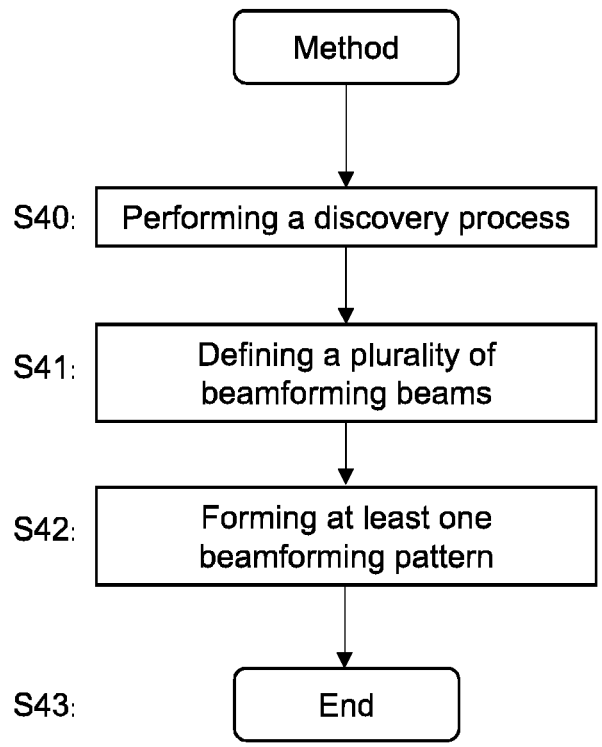
FIG. 4 shows a flowchart illustrating an example method according to at least some embodiments.

In FIG. 4, a method according to at least some example embodiments is illustrated. The method starts in step S40 with performing a discovery process. In step S41, a plurality of beamforming beams is defined, from which at least one beamforming pattern is formed in step S42. Furthermore, the plurality of beamforming beams forming the at least one beam sweeping pattern differ in at least one of a range and a directivity, and the range of the plurality of beamforming beams is divided in at least two categories differing in range. Then, the method ends in step S43.

In at least some example embodiments, the forming of the at least one beamforming sweeping pattern prioritizes beamforming beams of the plurality of beamforming beams with shorter ranges over beamforming beams of the plurality of beamforming beams with longer ranges.

Figure 5:
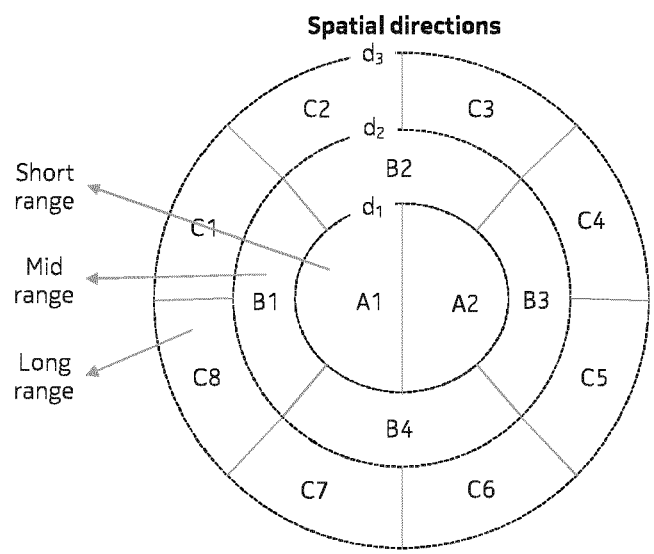
FIG. 5 shows an exemplary segmentation for different spatial directions, which are covered by different beamforming beams.

An example of this spatially selective beam sweeping pattern is depicted in FIG. 5. First, the beamforming beams are classified into beams for short, mid and long range. Short range beamforming beams aim at performing a discovery process within a distance of d1 of the first UE, mid range beamforming beams for a distance between d1 and d2 and long range beamforming beams for a distance between d2 and d3. It holds that d1<=d2<=d3. Further, it is illustrated that beamforming beams for a given distance can be classified based on their directivities. In the exemplary embodiment, beamforming beams for the short range have directivities optimized for segments A1 and A2. Beamforming beams for mid ranges have directivities 1, B2, B3 and B4, and beamforming beams for long ranges have directivities C1, C2, C3, C4, C5, C6, C7 and C8. It is noted that in this exemplary embodiment, the beamforming beams become narrower the longer the distance, i.e., while the opening angle for A1 and A2 is 180°, it is 90° for B1 to B4, and 45° for C1 to C8. In the following, we refer to a beamforming beam for a particular distance and directivity by the name identifying this distance/directivity in FIG. 5, i.e., beamforming beam A1, A2, etc. This spatial selectivity applies for both the Tx and Rx patterns at the first UE.

In at least some example embodiments, each of the plurality of beamforming beams has an associated identification sequence or explicit beam ID payload, which can also include other related information about the first UE. An at least second UE may use this information to detect which beamforming beam the first UE has chosen and whether it is a short, mid or long range beamforming beam.

Moreover, in at least some example embodiments, the beam sweeping pattern for the discovery process uses at least one resource pool comprising a plurality of slots for transmitting and receiving in time and frequency components. These slots are for instance represented as physical resource blocks (PRB) in LTE or NR.

In at least some example embodiments, the at least one resource pool for transmitting and receiving is scheduled by a central network. If the discovery process takes place in a coverage area where the first UE and the at least one second UE are connected with the same network, the slots of the at least one resource pool can be scheduled centrally.

Figure 6:
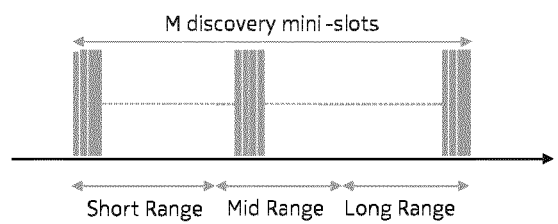
FIG. 6 shows an example of M slots of a resource pool for a time based scheduling.

In yet another example embodiment, the scheduling of the at least one resource pool is time based, and a subset of the plurality of slots is combined in groups representing the at least two categories in differing ranges and each of the plurality of beamforming beams is assigned to the respective group representing its category. This example embodiment is illustrated in FIG. 6, where a plurality of M slots is divided into three groups representing the slots used by the beamforming beams for short, mid and long range. The number of slots per group can vary and is a configuration parameter.

FIG. 7 shows a behavior of the UE while transmitting and receiving when the discovery process is performed with different beamforming beams. In case the UE is transmitting, it uses specific beamforming beams, e.g., A1, B4, and C3. On the other hand, when the UE is receiving, it does not necessarily use the same beamforming beams. Exemplarily, this is shown on the right hand side of FIG. 7, where the UE uses beamforming beams A1 or E1.

In FIG. 8, a diagram for the employed time resources of each beamforming beam is depicted. First, the short range beamforming beams A1 and A2 are scheduled and each of the two beamforming beams is assigned a dedicated time resource. Second, the beamforming beams 1, B2, B3 and B4 are scheduled, where 1 and B2 as well as B3 and B4 share a time resource. Eventually, the beamforming beams C1 to C8 are scheduled and C1 to C4 as well as C5 to C8 share a time resource. As a result of this scheduling and the range and directivity dependent properties of the beams of the plurality of beamforming beams, a higher priority and a higher number of time resources is given to discovering nearby UEs than those further away. The exemplary time resources shown in FIG. 8 have the same width (when seen in a horizontal direction), which is only for illustrative purposes. Instead of using time resources with the same width and scheduling multiple beamforming beams, e.g., 1 and B2, sharing a time resource, the width of time resources used for beamforming beams of larger distances can be reduced. In this case each beamforming beam is assigned an individual time resource with a specific width (duration). Further, it is noted that the term time resource is a general term, which is intended to cover, e.g., a specific time period or a predetermined time window.

In at least some of the embodiments, the scheduling of the plurality of slots is performed by a central network, independently by the first UE or based on a preallocated sequence. A signaling for a beamforming sweeping pattern according to at least one example embodiment is shown in FIG. 9. Entities involved in the scheduling are illustrated in a horizontal arrangement, such as a first UE and an at least one second UE. The use of a particular beamforming beam (one of A1, . . . , C8) exchanged between the entities is illustrated as an arrow. The time sequence of the messages is from "top-to-bottom" in the diagram. It can be observed that beamforming beams for a short range are used before beamforming beams for mid and long range. Within a group of slots, the beamforming beams for a particular directivity can be used in an arbitrary order and for instance may be based on a scheduling of a central network or on a preallocated sequence.

In at least some example embodiments, the time based scheduling of the at least one resource pool is designed to optimize a discovery time of an at least second UE in a statistical manner and the at least one beam sweeping pattern using the at least one resource pool is sent directly to the first and the at least second UE by a controlling node or is deducted through the UE number. The controlling node can be a third UE or the central network (e.g., represented by an eNB/gNB). Exemplarily, this procedure is depicted in FIG. 10 for two UEs being in distance smaller or equal than d1 to each other such that only the beamforming beams A1 and A2 are used. The first UE (UE1) transmits in one of the two directions (using either beamforming beam A1 or A2) and the at least one second UE (UE2) receives in one of the two directions (using either beams A1 or A2). The table in FIG. 10 describes all possible combinations that may be encountered. If UE1 uses beamforming beam A2 and UE2 uses beamforming beam A1, both UEs can discover each other. By exploiting statistical knowledge about the positions of the UEs, this table can be chosen such that the used beamforming sweeping pattern is optimized for a smaller detection time in the discovery process. Further, the time based scheduling of the at least one resource pool may change over time. According to at least another example embodiment, the scheduling of the at least one resource pool is pattern based and the plurality of slots is divided into a predefined number of slots for transmitting and receiving and the partition for the predefined number of slots for transmitting using the plurality of beamforming beams is based on the range and directivity of each beamforming beam. Further, the assignment of slots for transmitting within the plurality of slots is scheduled randomly or by a central network and the number of slots for transmitting and receiving is indicative of the access load during the discovery process.

In such a pattern based scenario all slots of the plurality of M slots can be used to transmit any beamforming beam, irrespectively of its spatial selectivity, i.e., range and directivity. The first UE is allowed to use K slots for Tx and receives in the remaining M-K slots. The scheduling of the K slots for transmission is performed randomly by the first UE or is done centrally by a network in case the UE resides in a coverage area. The actual number K is a configuration parameter that is based on the time the UE spends transmitting versus receiving. In case the at least one resource pool is shared among several devices, then K is also based on the discovery access load. The partition of the K slots across the different beamforming beams belonging to each spatial selectivity is done based on the importance of each category to be discovered. Therefore, it is $$K = \underset{\text{Short range}}{K\_1} + \underset{\text{Mid range}}{K\_2} + \underset{\text{Long range}}{K\_3}$$

where in general K_1>=K_2>=K_3.

FIG. 11a shows an example of M slots of a resource pool for a pattern based scheduling, wherein these slots are available for all the patterns (i.e., there is no grouping of slots). FIG. 11b shows an exemplary signaling diagram during a discovery process between two UEs.

In at least some example embodiments, the transmitting and receiving is performed in mmW frequencies.

In at least some example embodiments, the transmitting and receiving targets the discovery process of a SL communication as described in the background part of this document.

In at least some example embodiments, the transmitting and receiving is performed in half-duplex and full-duplex mode. It is to be understood that the performance for full-duplex operation, where the first UE transmits and receives using the same resources, will only be improved compared to half-duplex operation.

Figure 12:
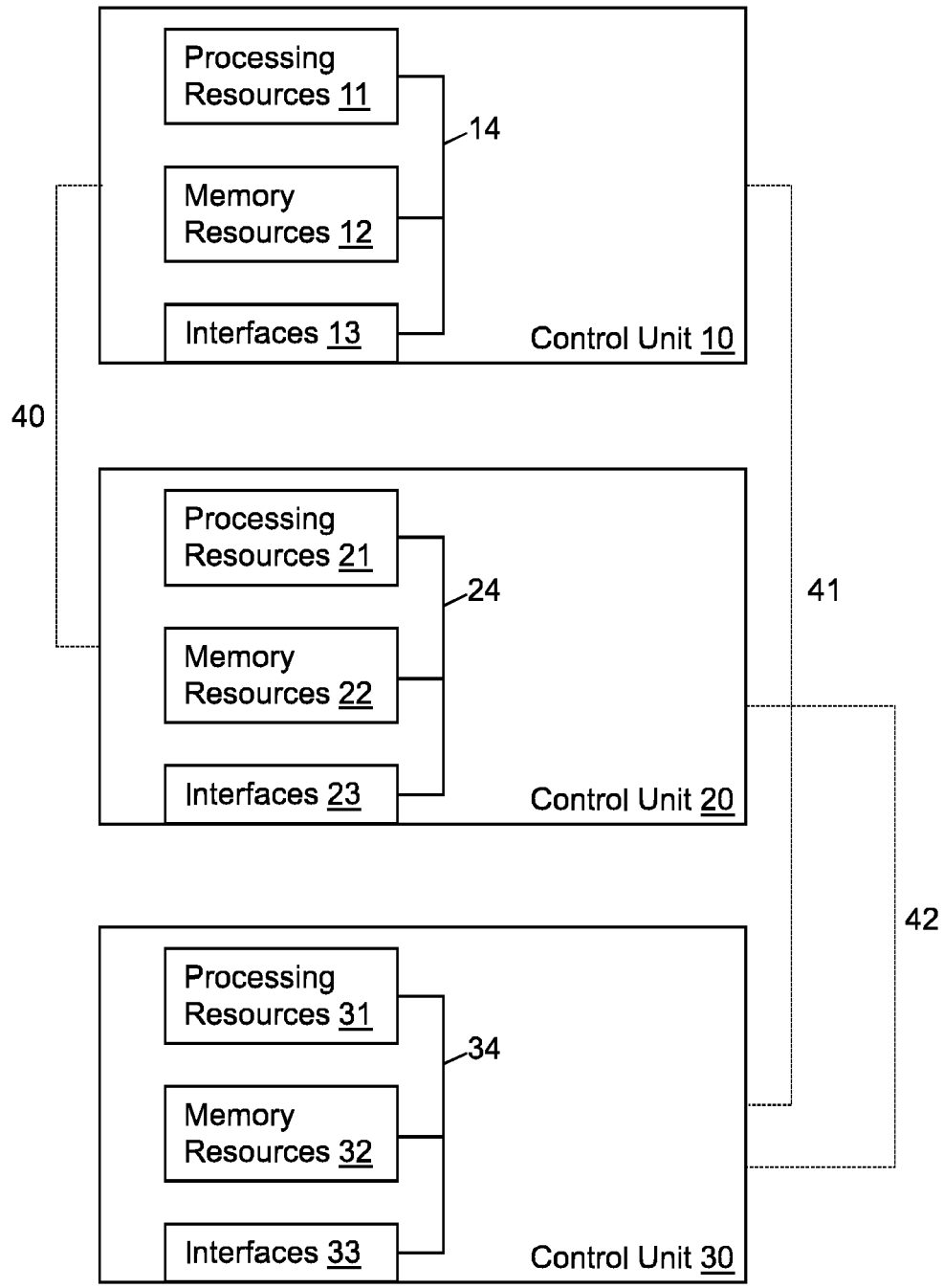
FIG. 12 shows a schematic block diagram illustrating a configuration of control units in which at least some example embodiments are implementable.

FIG. 12 depicts control units 10, 20, and 30, each comprising processing resources (e.g., processing circuitry) 11, 21, 31, memory resources (e.g., memory circuitry) 12, 22, 32 and interfaces (e.g., interface circuitry) 13, 23, 33. In at least one exemplary embodiment, the control unit 10 is configured to be implemented in and/or used by a first UE, the control unit 20 is configured to be implemented in and/or used by an at least one second UE, and the control unit 30 is configured to be implemented in and/or used by a central network. Further, each control unit has an own bus system 14, 24, 34 which connects the aforementioned resources such that data can be exchanged between the three components of a unit. In addition, control units 10 and 20, control units 20 and 30, as well as control units 10 and 30 can be connected wirelessly via links 40, 41, 42.

The terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software.

That is, each of the entities described in the present description may be based on different software, or some or all of the entities may be based on the same software. Each of the entities described in the present description may be embodied in the cloud.

According to the above description, it should thus be apparent that example embodiments provide, for example, a base station such as a gNB, or a component thereof, an apparatus embodying the same, a method for controlling and/or operating the same, and computer program(s) controlling and/or operating the same as well as mediums carrying such computer program(s) and forming computer program product(s).

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless internet access and browsing, as well as portable units or terminals that incorporate combinations of such functions.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use by a user terminal is provided. For example, the apparatus comprises the control unit 10 or control unit 20 shown in FIG. 12. According to another example implementation or in addition, the apparatus is configured to execute the method illustrated in FIG. 4.

The apparatus comprises means for performing a discovery process by a first user terminal in a wireless setting, wherein the discovery process comprises defining a plurality of beamforming beams for a spatially selective transmission or reception, forming at least one beam sweeping pattern from the plurality of beamforming beams at the first user terminal, wherein the plurality of beamforming beams forming the at least one beam sweeping pattern differ in at least one of a range and a directivity, and wherein the range of the plurality of beamforming beams is divided in at least two categories differing in range.

According to an example implementation, the forming of the at least one beamforming sweeping pattern prioritizes beamforming beams of the plurality of beamforming beams with shorter ranges over beamforming beams of the plurality of beamforming beams with longer ranges.

In an example implementation, in each of the plurality of beamforming beams an identification sequence of the beamforming beam, or an explicit beam ID payload together with information about the first user terminal is included.

According to an example implementation, the at least one beam sweeping pattern uses at least one resource pool comprising a plurality of slots for transmitting and receiving in time and frequency components.

According to an example implementation, the at least one resource pool for transmitting and receiving is scheduled by a central network.

In an example implementation a scheduling of the at least one resource pool is time based, wherein a subset of the plurality of slots is combined in groups representing the at least two categories in differing ranges, and wherein each of the plurality of beamforming beams is assigned to the respective group representing its range category.

According to an example implementation, a transmitting and receiving time of each of the beamforming beams of the plurality of beamforming beams with shorter ranges is longer than the transmitting and receiving time of each of the beamforming beams of the plurality of beamforming beams with longer ranges for an improved discovery process in close proximity to the first user terminal.

In an example implementation, the scheduling of the plurality of slots is performed by a central network, independently by the first user terminal or based on a pre-allocated sequence.

According to an example implementation, the time based scheduling of the at least one resource pool is designed to optimize a discovery time of an at least one second user terminal in a statistical manner, wherein the at least one beam sweeping pattern using the at least one resource pool is sent directly to the first and the at least one second user terminal by a controlling node, or deducted through a user terminal identification number, and wherein the time based scheduling of the at least one resource pool is further configured to change over time.

In an example implementation, a scheduling of the at least one resource pool is pattern based and the plurality of slots is divided into a predefined number of slots for transmitting and receiving, and wherein the partition for the predefined number of slots for transmitting across the plurality of beamforming beams is based on the range and directivity of each beamforming beam.

According to an example implementation, the assignment of slots for transmitting within the plurality of slots is scheduled randomly or by a central network, and wherein the number of slots for transmitting is chosen based on the first user terminal's time used for transmitting and receiving indicative of the access load during the discovery process.

In an example implementation, the transmitting and receiving is performed in millimeter wave frequency.

According to an example implementation, the transmitting and receiving targets the direct discovery process of a sidelink communication.

In an example implementation, the transmitting and receiving is performed in half-duplex mode or full-duplex mode.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

What is claimed is:

1. A method, comprising
performing a discovery process by a first user terminal in a wireless setting, wherein the discovery process comprises
defining a plurality of beamforming beams for a spatially selective transmission or reception,
forming at least one beam sweeping pattern from the plurality of beamforming beams at the first user terminal,
wherein the plurality of beamforming beams forming the at least one beam sweeping pattern differ in at least one of a range and a directivity,
wherein the at least one beam sweeping pattern uses at least one resource pool comprising a plurality of slots for transmitting and receiving in time and frequency components, and
wherein:
a scheduling of the at least one resource pool is time based,
a subset of the plurality of slots is combined in groups representing at least two categories differing in range,
each of the plurality of beamforming beams is assigned to the respective group representing its range category, and a transmitting and receiving time of each of the beamforming beams of the plurality of beamforming beams with shorter ranges is longer than the transmitting and receiving time of each of the beamforming beams of the plurality of beamforming beams with longer ranges for an improved discovery process in close proximity to the first user terminal, and wherein the range of the plurality of beamforming beams is divided in the at least two categories differing in range.

2. The method according to claim 1, wherein the forming of the at least one beamforming sweeping pattern prioritizes beamforming beams of the plurality of beamforming beams with shorter ranges over beamforming beams of the plurality of beamforming beams with longer ranges.

3. The method according to claim 1, wherein the at least one resource pool for transmitting and receiving is scheduled by a central network.

4. The method according to claim 1, wherein the scheduling of the plurality of slots is performed by a central network, independently by the first user terminal or based on a pre allocated sequence.

5. The method according to claim 1,
wherein the time based scheduling of the at least one resource pool is designed to optimize a discovery time of an at least one second user terminal in a statistical manner,
wherein the at least one beam sweeping pattern using the at least one resource pool is sent directly to the first and the at least one second user terminal by a controlling node, or deducted through a user terminal identification number, and
wherein the time based scheduling of the at least one resource pool is further configured to change over time.

6. The method according to claim 1,
wherein a scheduling of the at least one resource pool is pattern based and the plurality of slots is divided into a predefined number of slots for transmitting and receiving, and
wherein a partition for the predefined number of slots for transmitting across the plurality of beamforming beams is based on the range and directivity of each beamforming beam.

7. A non-transitory computer-readable storage medium storing a program comprising software code portions that, when run on a processor of a user terminal, cause the processor to perform the method according to claim 1.

8. An apparatus comprising at least one processor and at least one memory including computer program code, the at least one memory and the computer program code configured to, with the at least one processor, cause the apparatus at least to perform:
performing a discovery process by a first user terminal in a wireless setting, wherein the discovery process comprises
defining a plurality of beamforming beams for a spatially selective transmission or reception,
forming at least one beam sweeping pattern from the plurality of beamforming beams at the first user terminal,
wherein the plurality of beamforming beams forming the at least one beam sweeping pattern differ in at least one of a range and a directivity,
wherein the at least one beam sweeping pattern uses at least one resource pool comprising a plurality of slots for transmitting and receiving in time and frequency components, and
wherein:
a scheduling of the at least one resource pool is time based,
a subset of the plurality of slots is combined in groups representing at least two categories differing in range,
each of the plurality of beamforming beams is assigned to the respective group representing its range category, and
a transmitting and receiving time of each of the beamforming beams of the plurality of beamforming beams with shorter ranges is longer than the transmitting and receiving time of each of the beamforming beams of the plurality of beamforming beams with longer ranges for an improved discovery process in close proximity to the first user terminal, and
wherein the range of the plurality of beamforming beams is divided in the at least two categories differing in range.

9. The apparatus according to claim 8, wherein the forming of the at least one beamforming sweeping pattern prioritizes beamforming beams of the plurality of beamforming beams with shorter ranges over beamforming beams of the plurality of beamforming beams with longer ranges.

10. The apparatus according to claim 8, wherein the at least one resource pool for transmitting and receiving is scheduled by a central network.

11. The apparatus according to claim 8, wherein the scheduling of the plurality of slots is performed by a central network, independently by the first user terminal or based on a pre allocated sequence.

12. The apparatus according to claim 8,
wherein the time based scheduling of the at least one resource pool is designed to optimize a discovery time of an at least one second user terminal in a statistical manner,
wherein the at least one beam sweeping pattern using the at least one resource pool is sent directly to the first and the at least one second user terminal by a controlling node, or deducted through a user terminal identification number, and
wherein the time based scheduling of the at least one resource pool is further configured to change over time.

13. The apparatus according to claim 8,
wherein a scheduling of the at least one resource pool is pattern based and the plurality of slots is divided into a predefined number of slots for transmitting and receiving, and
wherein a partition for the predefined number of slots for transmitting across the plurality of beamforming beams is based on the range and directivity of each beamforming beam.

14. The apparatus according to claim 13,
wherein the assignment of slots for transmitting within the plurality of slots is scheduled randomly or by a central network, and
wherein the number of slots for transmitting is chosen based on the first user terminal's time used for transmitting and receiving indicative of an access load during the discovery process.

* * * * *